(12) United States Patent
Hamman

(10) Patent No.: US 8,475,108 B2
(45) Date of Patent: Jul. 2, 2013

(54) SYSTEM AND METHOD FOR MOVING LARGE OBJECTS

(75) Inventor: Baron L. Hamman, Dallas, TX (US)

(73) Assignee: Castlewood Medical Technologies LLC, Dallas, TX (US)

( * ) Notice: Subject to any disclaimer, the term of this patent is extended or adjusted under 35 U.S.C. 154(b) by 689 days.

(21) Appl. No.: 12/252,240

(22) Filed: Oct. 15, 2008

(65) Prior Publication Data

US 2009/0104009 A1 Apr. 23, 2009

Related U.S. Application Data

(60) Provisional application No. 60/980,625, filed on Oct. 17, 2007.

(51) Int. Cl.
*B60B 29/00* (2006.01)

(52) U.S. Cl.
USPC .............. 414/428; 414/430; 414/463; 280/62

(58) Field of Classification Search
USPC .. 414/426, 428, 430, 463, 466, 469; 280/200, 280/202, 220, 224, 226.1, 238, 231, 288.4, 280/32.7, 263, 292, 294, 62, 210, 212, 214; 180/904
See application file for complete search history.

(56) References Cited

U.S. PATENT DOCUMENTS

| | | | | |
|---|---|---|---|---|
| 301,702 A * | 7/1884 | Fay | ............................. | 280/202 |
| 328,693 A * | 10/1885 | Latta | ............................ | 280/200 |
| 591,227 A * | 10/1897 | Eilemeyer | .................... | 280/270 |
| 770,436 A * | 9/1904 | Mansfield | ..................... | 414/430 |
| 1,838,224 A * | 12/1931 | Holloway | .................. | 298/19 R |
| 1,885,627 A * | 11/1932 | Radar | ........................... | 280/204 |
| 2,350,118 A * | 5/1944 | Knapp | ......................... | 414/430 |
| 2,358,864 A * | 9/1944 | Lockwood | ................... | 414/430 |
| 2,608,312 A * | 8/1952 | Day | .............................. | 414/430 |
| 3,586,187 A * | 6/1971 | Wright | ........................ | 414/428 |
| 3,662,911 A * | 5/1972 | Harman | ...................... | 414/430 |
| 3,749,266 A * | 7/1973 | Gordon | ....................... | 414/430 |
| 3,848,891 A * | 11/1974 | Vittori | ......................... | 280/250 |
| 3,902,613 A * | 9/1975 | Newland | ...................... | 414/538 |
| 3,934,666 A * | 1/1976 | Ellington | ....................... | 180/11 |
| 4,036,384 A * | 7/1977 | Johnson | ...................... | 414/430 |

(Continued)

OTHER PUBLICATIONS

Priceless Aircraft Tugs, Trailer Tugs and spotters; http://www.pricelesstugs.com, 2 pgs., Oct. 13, 2008.

(Continued)

*Primary Examiner* — James Keenan
*Assistant Examiner* — Glenn Myers
(74) *Attorney, Agent, or Firm* — Patent Capital Group

(57) ABSTRACT

A system for moving a large object is provided that includes one or more wheels in contact with a ground surface and two pedals coupled to at least one wheel such that a downward force on at least one of the pedals by an operator seated on the system causes the wheels to move in a forward direction. The system further includes a gearing element that includes a gearbox that translates the downward force to the wheels. The system also includes a loading element that receives at least a portion of the large object such that it can be transported when the wheels move in the forward direction, where the large object weighs at least 300 pounds. In more specific embodiments, the system includes a steering component that includes one of the wheels, where the steering component allows a direction of the system to be guided by the operator.

19 Claims, 4 Drawing Sheets

U.S. PATENT DOCUMENTS

| | | | | |
|---|---|---|---|---|
| 4,103,799 | A * | 8/1978 | Perez | 414/563 |
| 4,121,695 | A * | 10/1978 | Carpenter | 414/539 |
| 4,221,276 | A * | 9/1980 | Mitchell et al. | 180/209 |
| 4,225,279 | A * | 9/1980 | Boyer | 414/428 |
| 4,347,700 | A * | 9/1982 | Kantner et al. | 60/325 |
| 4,415,056 | A * | 11/1983 | Smith | 180/210 |
| 4,518,057 | A * | 5/1985 | McCallum | 180/210 |
| 4,580,652 | A * | 4/1986 | Turner et al. | 180/210 |
| 4,655,309 | A * | 4/1987 | Imaizumi et al. | 180/215 |
| 4,666,172 | A * | 5/1987 | Hartmann | 280/238 |
| 4,674,589 | A * | 6/1987 | Szymkowiak | 180/215 |
| 4,679,807 | A * | 7/1987 | Raybon | 280/65 |
| 4,716,777 | A * | 1/1988 | Hartmann | 74/369 |
| 4,950,121 | A * | 8/1990 | Meyer et al. | 414/428 |
| 5,033,931 | A * | 7/1991 | Mann | 414/480 |
| 5,302,075 | A * | 4/1994 | Zschoche | 414/428 |
| 5,346,234 | A * | 9/1994 | Kadaja | 280/216 |
| 5,454,578 | A * | 10/1995 | Neack | 280/204 |
| 5,501,480 | A * | 3/1996 | Ordelman et al. | 280/304.1 |
| 6,104,154 | A * | 8/2000 | Harada et al. | 318/362 |
| 6,659,488 | B1 * | 12/2003 | Beresnitzky et al. | 280/282 |
| 6,718,116 | B1 * | 4/2004 | Slusher | 385/147 |
| 6,932,370 | B2 * | 8/2005 | Jones et al. | 280/282 |
| 7,017,685 | B2 * | 3/2006 | Schoenberg | 180/2.1 |
| 2005/0253348 | A1 * | 11/2005 | Gwisdalla | 280/30 |
| 2006/0096269 | A1 * | 5/2006 | McLean et al. | 56/228 |

OTHER PUBLICATIONS

Aircraft Tugs & Tow Bars; http://www.dragger.com, 1 pg., Oct. 13, 2008.
PowerTow MFG of Aircraft Towing Equipment; http://www.powertow.com/products.html, 1 pg., Oct. 13, 2008.
Get-Jet 1800 by Aero-Tow; http://www.aero-tow.com/GJ1800.htm, 2 pgs., Oct. 13, 2008.
Aero-Tow Lil Sherman; http://www.aero-tow.com/lilsherman.htm, 2 pgs., Oct. 13, 2008.
Thrust trailer tugger; http://www.littlestarproducts.com, 1 pg., Oct. 13, 2008.

\* cited by examiner

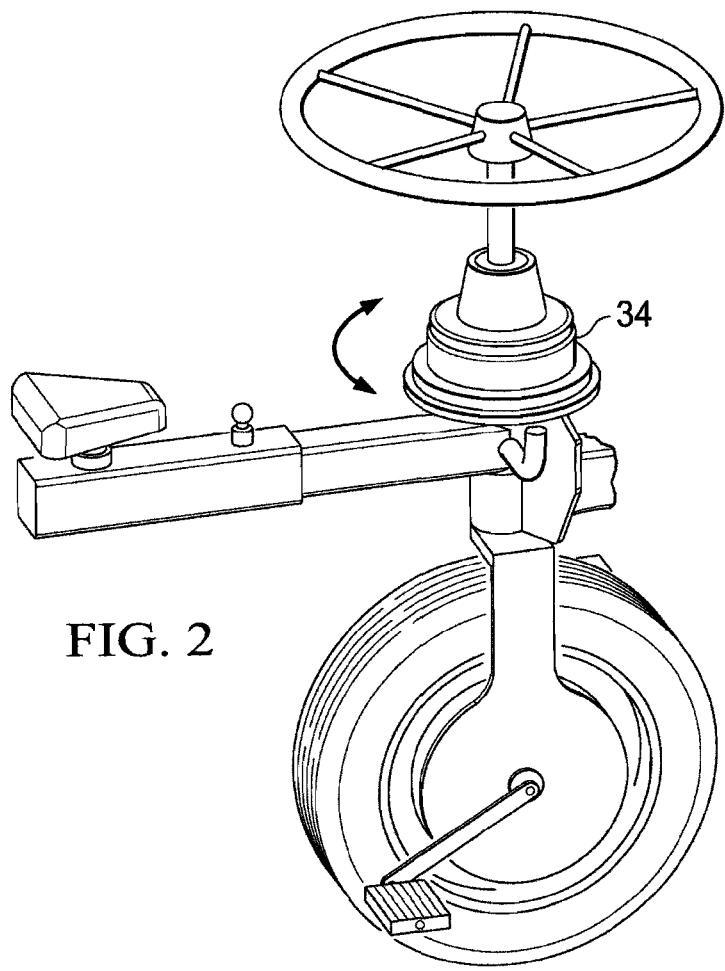
FIG. 2
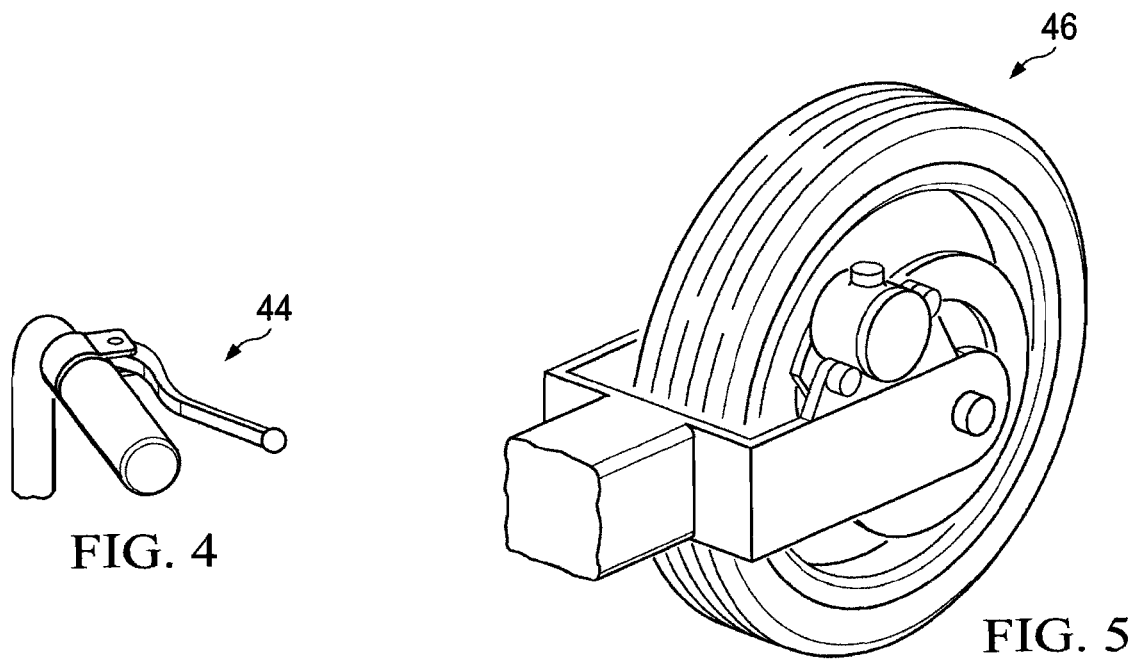
FIG. 4
FIG. 5

SYSTEM AND METHOD FOR MOVING LARGE OBJECTS

CLAIMING PRIORITY ON A PROVISIONAL

This application claims priority under 35 U.S.C. §119 of provisional application Ser. No. 60/980,625, filed Oct. 17, 2007 and entitled TUGBAR.

TECHNICAL FIELD OF THE INVENTION

This invention relates in general to transportation and, more particularly, to a system and a method for moving large objects.

BACKGROUND OF THE INVENTION

When simple movement of heavy objects is needed, there are a number of machines that can be employed to overpower gravity, friction, and inertia in moving these objects. Generally, these solutions involve burning fossil fuels, as well as creating unnecessary noise and burdensome coordination to orchestrate simple linear movement. Consider an example case in which a heavy object, such as an airplane, needs to be moved a short, precise distance. This may be relevant to positioning a plane for repair, for fuel, or for nominal taxiing before takeoff.

Unfortunately, accomplishing this trivial movement involves significant overhead, implicates an additional operator (who is commissioned to tow the plane), and requires an exact and timely coordination with some sort of motorized towing mechanism. Were there to be a lack of synchronization between parties, the party seeking to move the large object could be delayed significantly, or simply unable to use his preferred mode of transportation. Thus, providing a convenient and reliable mechanism for transporting large objects presents a significant challenge for component manufacturers and device designers, alike.

BRIEF DESCRIPTION OF THE DRAWINGS

To provide a more complete understanding of the present invention and features and advantages thereof, reference is made to the following description, taken in conjunction with the accompanying figures, where like reference numerals represent like parts, in which:

FIG. 2 is a simplified block diagram that illustrates a view of a wheel assembly and a steering component of the system in accordance with a particular embodiment of the present invention;

FIG. 4 is a simplified block diagram that illustrates a view of a braking mechanism for the system in accordance with a particular embodiment of the present invention;

FIG. 5 is a simplified block diagram that illustrates another braking system in accordance with particular embodiments of the present invention.

DETAILED DESCRIPTION OF THE INVENTION

For purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

Figure 1:
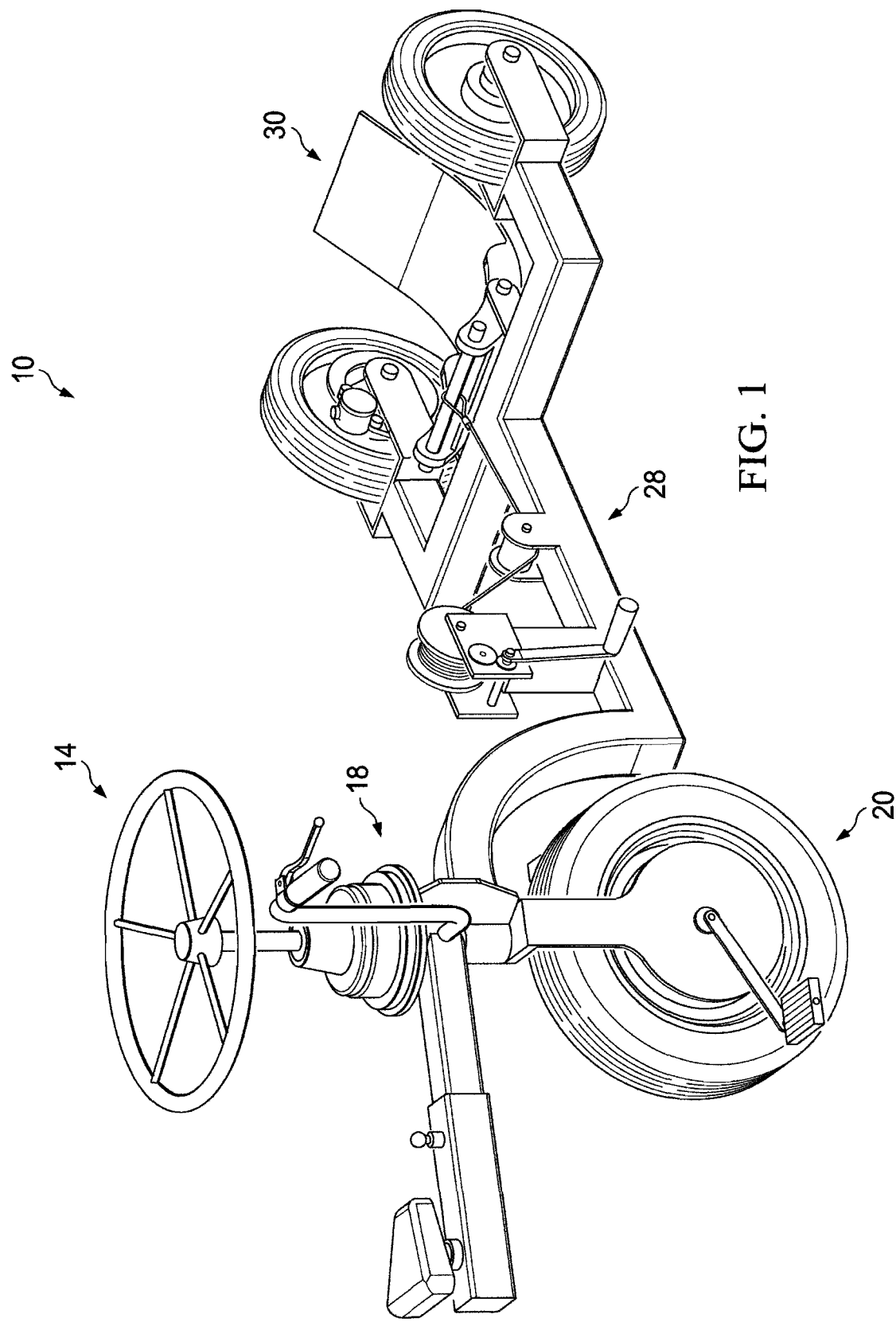
FIG. 1 is a simplified block diagram that illustrates a system for moving large objects in accordance with a particular embodiment of the present invention.

FIG. 1 is a simplified block diagram that illustrates a system 10 for moving large objects in accordance with a particular embodiment of the present invention. System 10 includes a steering component 14, a gearing element 18, a wheel assembly 20, a cable mechanism 28, and a loading element 30.

In accordance with the teachings of the present invention, system 10 can be used to move virtually any heavy objects in confined areas (e.g. an airplane on an airport location), where precision of movement is paramount, and where noisy, heavy machinery is less than desirable. Other potential applications of system 10 include those that deal with indoor pallets (hospitals, retail warehouse "stores", etc.), places where movement should be quiet (libraries, hospitals and nursing homes, research laboratories), arenas with poor ventilation (building sites, mines) and places where fossil/electric power is problematic (developing countries, remote islands).

Turning to an illustrative example involving airplanes, note that many airplanes are housed in places with uneven surfaces. These planes are typically moved infrequently. Maintaining a conventional motorized tug for infrequent movement is costly and logistically problematic. Some planes are in large community hangars, where these planes are rarely moved. Using a conventional tug for frequent, short, and precise movement is fuel inefficient, noisy, and dirty.

Current estimates project that there are nearly 200,000 personal aircraft in operation in the United States. Of these, over 16,000 airplanes are multi-engine piston (light twins) with a typical empty gross weight from 2,500 to 5,000 lb. There are another 5,000 light turboprop aircraft in the same weight range. 140,000 aircraft are single-engine piston aircraft. Additionally, there are approximately 600,000 active aircraft pilots in the United States. There are 5,000 public airports and another 10,000 private airports that house these aircrafts. Typically, each airport will host about 1 to 5 fixed base operators (FBOs) who house, maintain, and service these aircrafts. Most airports will host 1 to 3 additional supporting businesses related to aviation. The majority of FBOs own 1 to 3 aircraft, but routinely move 10 to >100 aircraft each business day. Most movement is done for fuel, parking, and maintenance issues.

Virtually all of these movements are short (<50 yards) distances. All movements require operator attention and exact precision. Surfaces of airports are often slight grades: intentionally constructed for rain drainage. Hangar doors are often run on rails that protrude about one inch (or more) above the surface of the hangar/tarmac floor. These parameters present obstacles to short precise movements.

Maintaining an expensive motorized tug for infrequent use is inefficient and costly. Keeping fuel for the tug is also problematic. Running a piston machine infrequently is excessive and further burdens others with machine maintenance (fuel, lubrication, current power supply, etc.). The noise and pollution are similarly problematic: particularly in enclosed spaces.

System 10 is a versatile, maneuverable, lightweight, strong tool that can move heavy objects precisely. Because of its proprietary transmission gearing and mechanically advantaged steering (embodied by gearing element 18 and wheel assembly 20), there is virtually no scheduled maintenance or necessary fluids or lubricants. Moreover, because human power is amplified to move the object, there are zero carbon emissions, minimal noise, and no heat signature.

System 10 is a human powered, tricycle shaped tug in which the operator sits on a seat and pedals the unicycle-style guiding nose wheel to power the movement of the object. Steering component 14 includes a wheel (which could be replaced with handles, handlebars, or any other element that assists in guiding system 10).

Tricycle geometry is optimal for continual contact of all wheels on irregular surfaces. Thus, this design is optimal for stability of the loaded tug. The pivot point of the desired load (e.g., a nose wheel or a trailer tongue) is closer to the open end of the device (the paired passive wheels) to allow a large angle of directional change over a short distance, thus making the device optimal for maneuvering loads. The center of gravity of the loaded tug is closer to the passive paired wheels to provide friction for braking action. Most of the weight can be on the paired passive wheels that can be fitted with motorcycle style hydraulic hand brakes: potentially actuated by a single fixed hand reservoir. Spreading the wheels apart (about four feet) increases the stability of the loaded tug. The paired wheel, wide spread allows irregularly shaped objects to be loaded freely without concern for touching the tug support. The wheels can be large enough (e.g., 12 inches diameter) that moving over a short (e.g., 2 inches) obstacle is smooth and easy.

Note that the modular manufacture of system 10 allows for an easy disassembly and reassembly with commonly found tools and easily replaceable connectors (e.g., fasteners, bolts, nuts, etc.). In certain designs, several simple components can bolt together quickly and with minimal instruction. The tricycle geometry for load movement is superior for its maneuverability, ease of steering a nose-wheel of the tricycle of the load (airplane), and efficiency of using an optimal number of rolling contacts. The unicycle front-wheel concept allows a re-direction of the load on base wheels. In addition, the easily directed unicycle wheel uses a mechanical advantage (planetary gearing) to overcome friction of the tire/road interface. Moreover, the typical loading of a front wheel of a heavy object is cumbersome, but the scissor design of system 10 allows an improved mechanism with a more secure loading of the aircraft wheel.

In addition, the design of system 10 reflects an optimal site of the nose wheel seat, where the design factored in maneuverability (closer to the line directly between the two carrier wheels) vs. balance of the load (closer to the unicycle power and directional control source). The design can also deliver optimal gearing for an in-transit seating of the unicycle nose-wheel (e.g., 13:1) power take-off using a coaxial gearing system that allows an operator to remain seated, while pedal pushing or pulling a load. The optimal gearing for transport of a typical light twin airplane over the lip of a typical hangar is about 9:1 coaxial power takeoff. In one example design, there is also an efficient braking mechanism that includes a system for a single-handle actuator of two disc brakes on the load-bearing carrier wheels.

FIG. 2 is a simplified block diagram that illustrates another view of steering component 14, wheel assembly 20, and gearing element 18 of the system in accordance with a particular embodiment of the present invention. Gearing element 18 further includes a gearbox 34, which sets a given ratio for amplifying or translating a pedal force to a linear force through one or more wheels such that a load is moved a given distance.

In operation of the device, the weight of the load and the operator can be transmitted to the single drive wheel. Use of a single wheel to drive allows for simplicity of the conceptual locomotion for the operator. Further, the narrow nose of the tricycle augments manipulation in tight spaces. The single drive wheel eliminates the problems of a differential drive when extremes of steering move two turning wheels at different rates. These advantages outweigh the simplicity of two widely-spread drive wheels. A distributed load weight serves to augment traction of the drive wheel. Further, drive-wheel traction issues are solved by using a relatively wide trailer tire for broad contact with the surface.

Gearbox 34 provides a great mechanical advantage (12:1), but this ratio could be changed considerably without departing from the scope of the present invention. The mechanical advantage allows a normal human to easily turn or steer the wheel that he is driving. The mechanical advantage also allows the operator to arrest the torque on the unicycle that comes from pushing the drive pedal. It is imperative to note that all of the ratios and leveraging relationships outlined herein (e.g., 12:1, 13:1, 9:1, 3-times, 12-times, etc.) have only been offered for purposes of example and teaching only. Each of these data may be varied considerably without departing from the spirit of the present invention, or the scope of the appended claims. The specifications outlined apply only to one non-limiting example and, accordingly, should be construed as such.

Any need to turn the drive wheels nearly 360° (for load maneuverability) introduces a desire for a gearing system that can be contained in the "unicycle" drive wheel component. The requirements of a self-contained transmission lead to the development of a coaxial planetary gearing system in accordance with a more specific embodiment. A single speed gearbox can readily be used in system 10. Further, variable speeds or power takeoffs can be readily accommodated in certain embodiments of the present invention. Since many conditions of load movement are anticipated, a wide range of power takeoffs (mechanical advantage) may be required of the same device under different conditions. The optimal gearing would allow an operator to apply the usual force to a pedal that would be amplified by the pedal lever and a coaxial gearing system to exert, for example, 3-times to 12-times the power to the wheel. For rapid and easy positioning of system 10, a neutral gear for hand moving could be employed. Lightweight materials for unique self-lubricating gearing in the transmission can also be used.

Revisiting some of the environmental factors that have engendered much of the work behind system 10, fossil fuel energy has suddenly become a rather scare commodity. Previously, a number of inefficient strategies of simply overpowering the opposing frictional forces have been widely applied in moving heavy objects. The resultant tools are powerful, but embarrassingly inefficient. More efficient application and amplification of human power [to more clever tools] allows for muscle power to precisely move even the heaviest of objects.

System 10 reflects a possible solution in this towing arena: a solution that offers a lightweight tricycle-shaped tug for moving large objects. One important feature of system 10 is the proprietary lightweight coaxial unicycle driver, which allows directional transmission of leveraged power to an easily maneuverable, balanced, quiet, and clean tug. Specifically, system 10 provides a large mechanical advantage in pulling, lifting, and twisting large objects.

In operation, the proprietary transmission allows an operator to apply forces to a pedal that will be amplified by a lever and a coaxial gearing system to exert 3-times to 12-times the power to the movement of the wheel. For lifting, system 10 can easily lift the nose wheel of an airplane, as the unique application of angles for lifting a nose-wheel load will allow a single operator to accurately and easily load and lock a 1,000 lb nose-wheel of rolling stock. For twisting (or turning the nose-wheel), the proprietary transmission allows the rider to easily and nimbly change the angle of the unicycle wheel angle to create maneuverability of the load-bearing nose lift system.

System 10 also offers a variable speed, where the proprietary transmission allows variable amplification of power to create a range of transport speeds (including neutral for moving and positioning the tug). The design is lightweight, which allows for space-age materials to be used for unique gearing in the transmission. The solution is also self contained and easy to move. It should be noted that system 10 may be constructed of any suitable combination of steel, plastic, aluminum, titanium, or any other viable composition that could withstand, and could readily accommodate, the forces as explained herein.

Figure 3:
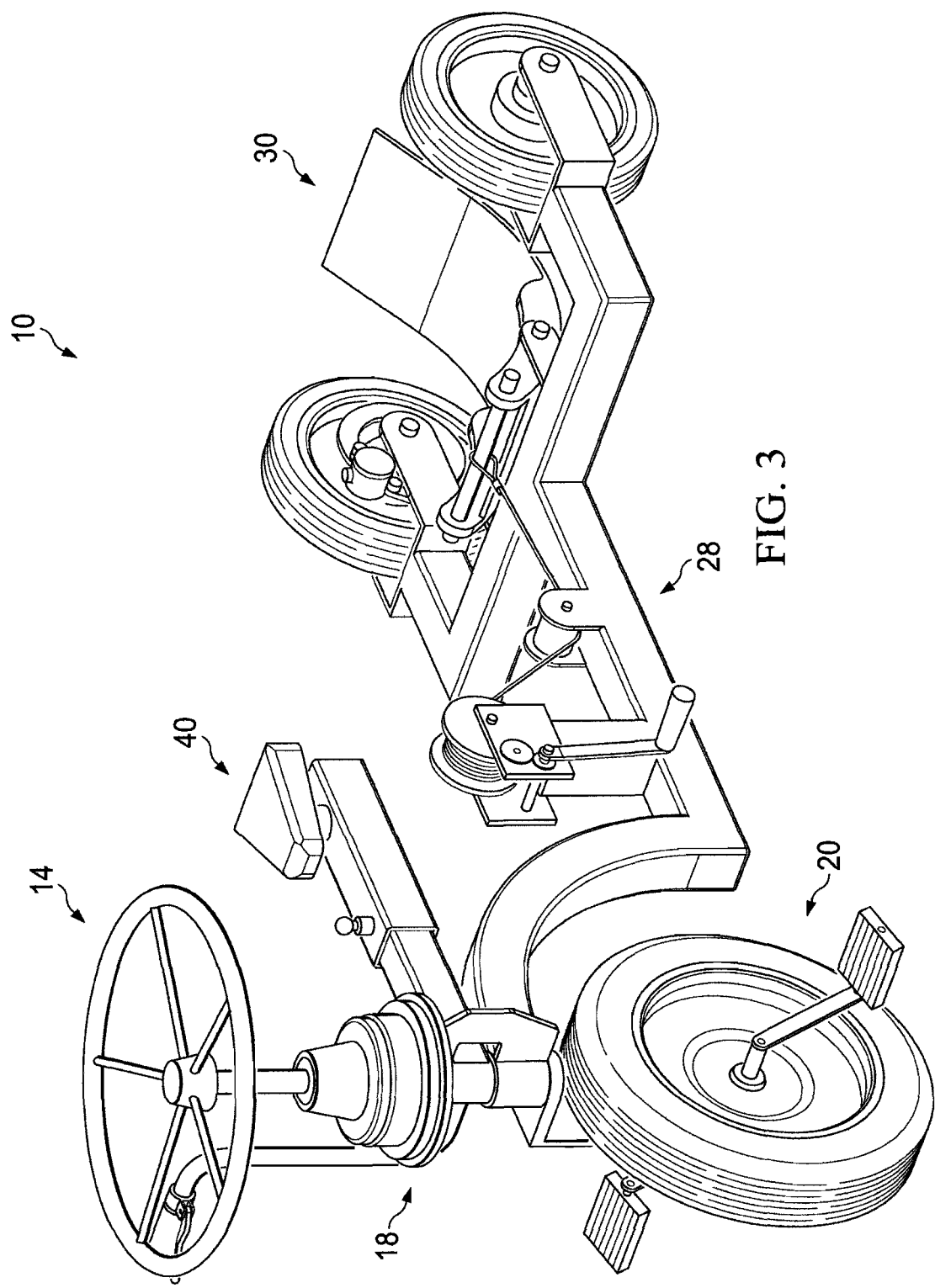
FIG. 3 is a simplified block diagram that illustrates another view of the system for moving large objects in accordance with a particular embodiment of the present invention.

FIG. 3 is a simplified block diagram that illustrates another view of system 10 for moving large objects in accordance with a particular embodiment of the present invention. In this instance, a seat 40 is swiveled around such that it is positioned behind a front wheel of system 10. In operation of an example embodiment where only a lifting operation is necessary, lifting the nose wheel of an airplane (e.g., about 350 lb) onto system 10 involves several activities. Getting under the wheel is solved by applying two variable but stoppable chocks on either side of the nose wheel. The wheel can be gently rocked onto the support bar that allows a 2-inch clearance from the flat surface. Use of a block and tackle mechanism on a hand wench allows for a smooth and a safe rotation of the chock rocker by a single operator.

FIG. 4 is a simplified block diagram that illustrates a view of a braking mechanism 44 for the system in accordance with a particular embodiment of the present invention.

FIG. 5 is a simplified block diagram that illustrates another braking system 46 in accordance with particular embodiments of the present invention. Stopping a moving load is critical to assure accurate and safe movement. Hydraulic brakes allow a great margin of safety and make a low maintenance system for reliable and strong brakes. Simple hand braking mechanisms, air brakes, disc brakes, drum brakes, pad brakes, or any other suitable braking mechanisms are certainly within the broad scope of the present invention.

Figure 6:
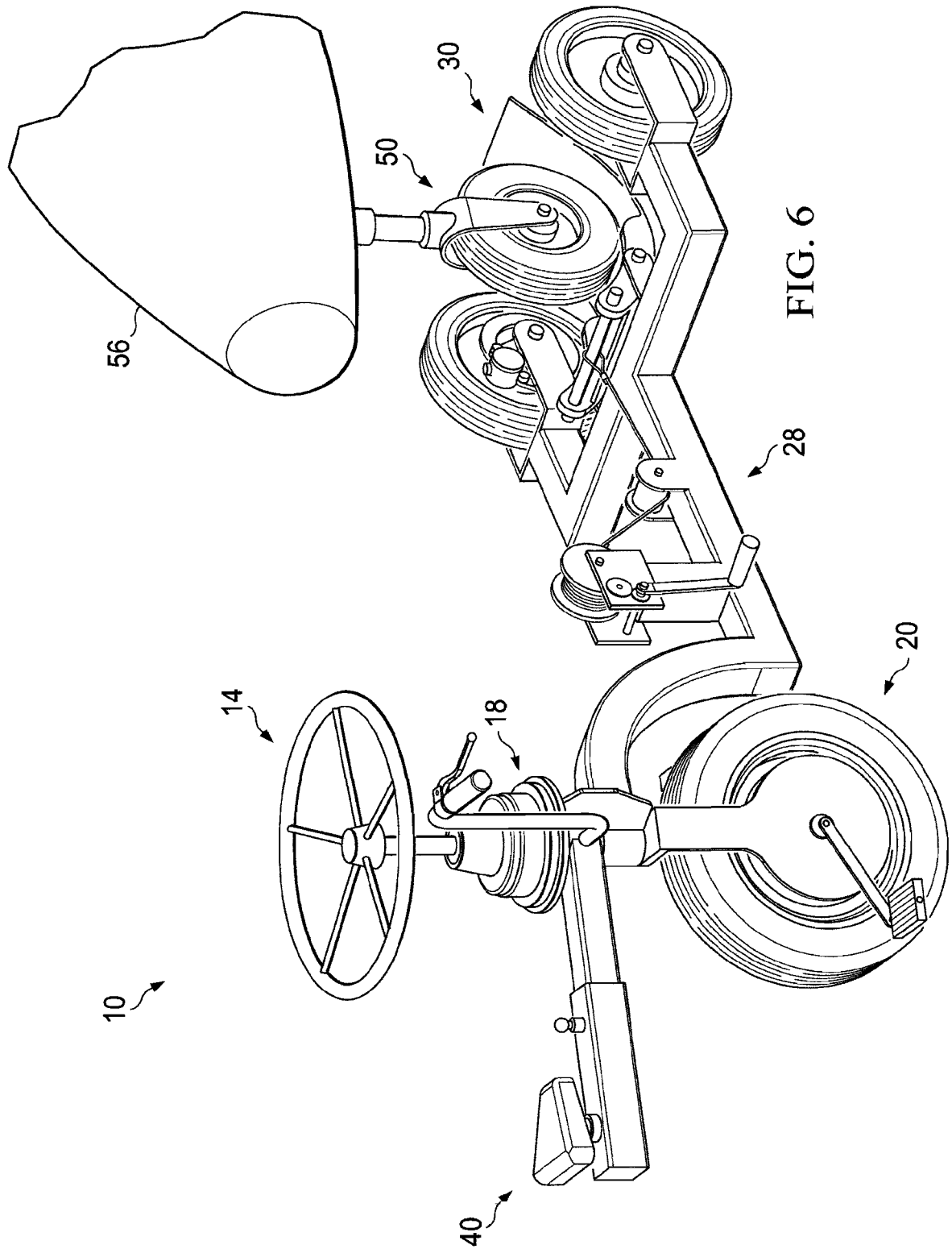
FIG. 6 is a simplified block diagram that illustrates an example operation involving an airplane in accordance with an embodiment of the present invention.

FIG. 6 is a simplified block diagram that illustrates an example operation involving an airplane 56 in accordance with an embodiment of the present invention. Also illustrated in FIG. 6 is a lip 50, which is part of loading element 30 that is coupled to cable mechanism 28. In operation of an example, system 10 is pedaled and positioned proximate to airplane 56. Any number of front-wheel loading techniques (as described above) can be employed to get the front wheel of airplane 56 onto lip 50. Once positioned there at a somewhat ground level, cable mechanism 28 (or any other suitable leveraging mechanism) can be used to slowly raise the front wheel and, thereby, raise airplane 56.

From this point, an operator of system 10 can begin pedaling system 10 and incrementally begin moving the load to its desired position. During this movement, brakes may be utilized, as needed, and airplane 56 may be secured once movement has been completed through any type of stabilization tool (e.g., simple blocking).

It is important to note that the stages and steps described above illustrate only some of the possible operations that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered.

The preceding example flows have been offered for purposes of teaching and discussion. Substantial flexibility is provided by the tendered system in that any suitable arrangements, chronologies, configurations, and timing mechanisms may be provided without departing from the broad scope of the present invention. Accordingly, any appropriate structure, component, or device may be included within system 10 to effectuate the tasks and operations of the elements and activities associated with providing optimal transportation of large objects.

Although the present invention has been described in detail with reference to particular embodiments, it should be understood that various other changes, substitutions, and alterations may be made hereto without departing from the spirit and scope of the present invention. The illustrated device and operations have only been offered for purposes of example and teaching. Suitable alternatives and substitutions are envisioned and contemplated by the present invention: such alternatives and substitutions being clearly within the broad scope of the proposed solutions. Using analogous reasoning, suitable devices that are conducive to the leveraging or gearing mechanisms of the present invention could readily be used or adopted by system 10. In addition, while the foregoing discussion has focused on airplane activities, any other suitable environment requiring movement of heavy objects may benefit from the teachings provided herein.

For example, system 10 can work as a forklift in other embodiments in which there is some minimal additional energy source that is used, possibly to assist in lifting the object onto system 10's loading element 30. This second loading element can cooperate with system 10 (or be built directly into system 10) to suitably position the large load before transporting it to its desired location.

Other applications of system 10 involve the movement of pallets (e.g., in hospitals, warehouses, grocery stores, etc.), or trailers that move other heavy objects. Additionally, there are countless military applications that could benefit from the teachings of the present invention. It is similarly imperative to note that system 10 can be scaled and geared differently to accommodate larger or smaller loads. For example, certain smaller loads may be as light as 200 lbs, whereas larger loads could exceed several tons or more. Any such weights could easily be accommodated by the present invention and any such permutations are clearly within the broad scope of the present invention.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system comprising:
    a front most wheel in contact with a ground surface;
    two pedals that are coupled to the front most wheel in a front wheel portion of the system;
    a gearing element that includes a gearbox that translates a downward force to the front most wheel;
    a loading element having sufficient strength to suspend a front portion of an airplane, wherein the loading element is provided between two back wheels in a rear wheel portion of the system, the loading element being configured to receive a front portion of the airplane for movement of the airplane, the loading element including a lip having a flat surface to receive a wheel of the airplane and configured for contact with the ground surface in preparation for loading of the front portion of the airplane;

a steering component, located in the front wheel portion, that controls directional movement of the system; and a seat securely attached and located in the front wheel portion and configured for movement in a horizontal plane such that the seat can swivel around a vertical axis of the steering component without moving the front most wheel and the two back wheels.

2. The system of claim 1, wherein the steering component is a steering wheel, a set of handles, or a set of handlebars.

3. The system of claim 1, wherein the seat is configured for a horizontal adjustment to change a distance of separation in relation to the steering component.

4. The system of claim 1, wherein the gearing element includes a 13:1 ratio and a power take-off using a coaxial gearing system that allows an operator to remain seated while exerting the downward force on at least one of the pedals.

5. The system of claim 1, further comprising:
a braking mechanism, which is controlled by an operator, and that restricts movement of the front most wheel.

6. The system of claim 5, wherein the braking mechanism includes a single-handle actuator of two disc brakes on load-bearing carrier wheels.

7. The system of claim 5, wherein the braking mechanism includes air brakes, disc brakes, drum brakes, pad brakes, or hand-actuated brakes.

8. The system of claim 1, wherein the gearing element includes a gearbox that includes a 12:1 gearing relationship.

9. The system of claim 1, wherein the front most wheel is configured to steer the system and be rotated 360° about its vertical axis, which is perpendicular to the ground surface.

10. The system of claim 1, wherein the front most wheel is part of a unicycle drive wheel component.

11. The system of claim 1, wherein the gearing element is coupled to a self-contained transmission.

12. The system of claim 11, wherein the transmission includes a range of power takeoffs.

13. The system of claim 1, wherein the gearing element includes a coaxial gearing system to exert 3-times to 12-times a power to the system.

14. The system of claim 1, wherein the gearing element includes a neutral gear for hand-movement.

15. The system of claim 1, wherein the gearing element includes a variable speed, wherein a transmission coupled to the gearing element allows variable amplification of power to create a range of transport speeds for the system.

16. The system of claim 1, wherein the system is fashioned as a tricycle having three wheels.

17. The system of claim 1, wherein the loading element includes a lip that facilitates loading of the object.

18. The system of claim 1, wherein the cable mechanism is configured for performing a ratcheting function for raising the object.

19. The system of claim 1, wherein the loading element is configured between the two back wheels of the system.

* * * * *